United States Patent [19]

Moriyama et al.

[11] Patent Number: 5,396,424
[45] Date of Patent: * Mar. 7, 1995

[54] CRASH SENSOR

[75] Inventors: Hiroshi Moriyama; Hiroyuki Sada, both of Ibaragi; Takeo Shiozawa, Kobe, all of Japan

[73] Assignee: Sensor Technology Co., Ltd., Kobe, Japan

[ * ] Notice: The portion of the term of this patent subsequent to Feb. 23, 2010 has been disclaimed.

[21] Appl. No.: 870,463

[22] Filed: Apr. 17, 1992

[30] Foreign Application Priority Data

Apr. 19, 1991 [JP] Japan .................. 3-116827

[51] Int. Cl.$^6$ ...................... B60R 21/16; B60R 21/32
[52] U.S. Cl. ................. 364/424.05; 340/436; 307/10.1; 280/734; 280/735; 180/282
[58] Field of Search ............... 364/424.05; 280/734, 280/735; 340/436, 438; 180/282; 307/10.1

[56] References Cited

U.S. PATENT DOCUMENTS

| | | | |
|---|---|---|---|
| 4,975,850 | 12/1990 | Diller | 364/424.05 |
| 4,985,835 | 1/1991 | Sterler et al. | 364/424.05 |
| 5,021,678 | 6/1991 | Diller | 340/436 |
| 5,189,311 | 2/1993 | Moriyama et al. | 301/10.1 |
| 5,208,484 | 5/1993 | Okano et al. | 340/436 |
| 5,229,943 | 7/1993 | Eigler et al. | 364/424.05 |

*Primary Examiner*—Gary Chin
*Assistant Examiner*—Tyrone V. Walker
*Attorney, Agent, or Firm*—Oblon, Spivak, McClelland, Maier, & Neustadt

[57] ABSTRACT

An electronic crash sensor which can operate appropriately in response to any form of crash of any vehicle, more especially to a high speed oblique or pole crash of a vehicle which has a less rigid body or to a compound crash which is compound of various forms of crash, to say nothing of a high speed oblique or pole crash of a vehicle which has a normal rigid body. An input acceleration waveform from an accelerometer is processed to peak cut any portion thereof lower than a predetermined value. Then, the value obtained by the said peak cutting is time integrated. Then, a time integrated value of a predetermined function is subtracted from the value obtained by the said time integration. Then, the value of the acceleration waveform thus obtained is firstly compared with a predetermined time function value, and when the former is higher than the latter, a triggering signal is developed, while a diffrential of the said values of the acceleration waveform per a predetermined time value is secondly compared with a predetermined value, and when the former is higher than the latter, a triggering signal is developed. And further, the said first comparing means and the said second comparing means are connect with a trigger circuit to trigger a passenger protecing apparatus called an air bag by way of a connecting means.

12 Claims, 4 Drawing Sheets

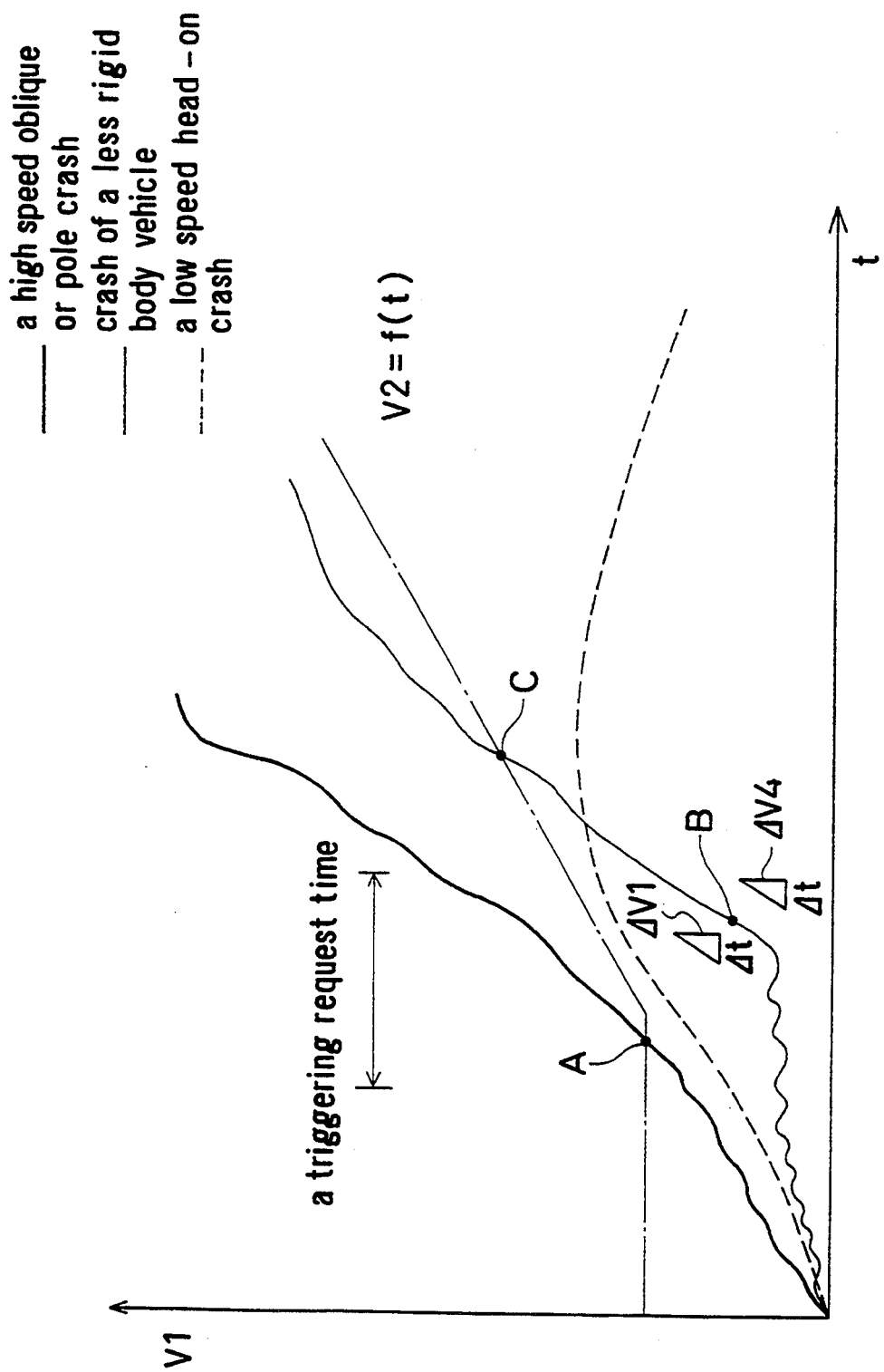

CRASH SENSOR

BACKGROUND OF THE INVENTION

1. Field of the Invention

This invention relates to a crash sensor suitable for the detection of crash of a vehicle with a triggering system of a passenger protecting apparatus calld an air bag.

2. Description of the Prior Art

Conventionally, crash sensors suitable for the detection of crash of a vehicle with a triggering system of a passenger protecting apparatus calld an air bag are divided into two types including a first type which employs a sensing mass and a second type which employs an electronic accelerometer. One of such crash sensors as employs an electronic accelerometer is disclosed in U.S. Pat. No. 3,701,903. This crash sensor comprises means for time integrating an acceleration, when the time integrated value exceeds a predetermined value, a passenger protecting apparatus calld an air bag is triggered. And another modified crash sensor is disclosed in U.S. Pat. No. 3,911,391, wherein, before time integration is performed, a predetermined acceleration is subtracted from an acceleration so that the passenger protecting apparatus can not be triggered, when an acceleration of a vehicle riding on a rough road is not such as to hurt a passenger.

With the crash sensor, however, the passenger protecting apparatus cannot always be triggered within a required period of time in all forms of forecasted crash with an actual vehicle. Particularly, acceleration waveform upon a low speed head-on crash in which triggering the passenger protecting apparatus is not required and upon a high speed oblique or pole crash of a vehicle which has a normal rigid body in which triggering the passenger protecting apparatus is required are very similar to each other and cannot be identified from each other at an initial stage of crash until the passenger protecting apparatus is triggered. In particular, as seen in FIG. 4, an acceleration waveform (shown by a dashed line) for a low speed head-on crash in which triggering the passenger protecting apparatus is not required, and another acceleration waveform (shown by a thick solid line for a high speed oblique or pole crash in which triggering the passenger protecting apparatus is required are very similar to each other over the period of time after the crash that is indicated from time ① to time ②, as shown in FIG. 4. It is over this period of time that it must be determined whether the passenger protecting apparatus should be triggered. Accordingly, as shown in FIG. 5, it is difficult to identify them from each other even with a crash sensor which subtracts a predetermined acceleration from a measured acceleration and then time integrates the difference (V1') thus obtained. As a result, if priority is given to a triggering requirement, unnecessary triggering of the apparatus will take place upon a low speed head-on crash. On the contrary, if priority is given to a no triggering requirement, a delay or lack of triggering of the apparatus will take place upon a high speed oblique or pole crash.

In order to solving this problem, this applicant has shown another invention of a crash sensor in JP 74457/90. According to one aspect of the JP 74457/90 crash sensor, there is provided a crash sensor which detects a crash of a vehicle from an acceleration waveform of an accelerometer to trigger the passenger protecting apparatus calld an air bag, comprising means for peak cutting any portion of the input acceleration waveform lower than a predetermined value, means for time integrating the value obtained by the said peak cutting, means for subtracting a time integrated value of a predetermined function from the value obtained by the said time integration, and means for first comparing the value obtained by the said subtraction with a predetermined time function value to develop a triggering signal.

According to the crash senser, while acceleration waveforms upon a low speed head-on crash and upon a high speed oblique or pole crash are almost the same in average acceleration at an initial stage of a crash which coincides with a triggering request time, an acceleration waveform upon a high speed oblique or pole crash has considerable vibration components as seen in FIG. 4 due to buckling, vibrations and so forth of a car body. Meanwhile, since most part of impact energy upon a low speed head-on crash is absorbed by an energy absorbing apparatus such as a bumper, vibration components are not so considerable. The crash sensor has been made with perceiving such difference in characteristic between the two acceleration waveforms. Accordingly, as seen in FIG. 5, such time integrated value of an acceleration upon a high speed oblique or pole crash which involves much vibration components is greater than a time integrated value of a mere difference of an acceleration from a fixed acceleration. Consequently, an identification can be made between a low speed head-on crash and a high speed oblique or pole crash with a higher degree of accuracy.

Forms of actual crash, however, are very complicated. In case of a high speed oblique or pole crash of a vehicle which has a less rigid body, and in case of a compound crash which is a compound of various forms of crash (e.g. a vehicle firstly crashed into a fence, secondly crashed into walls and continuously crashed into something.), an acceleration waveform (shown by a thin solid line curve) is low at an initial stage of a crash which coincides with a triggering request time as given as a section from ① to ② in FIG. 4. Namely, in these cases, the passenger protecting apparatus cannot be triggered within a triggering request time. In these cases, the means for a first comparing, as seen in FIG. 5, solves only the problem of an identification between a low speed head-on crash and a high speed oblique or pole crash of a vehicle which has a normal rigid body. Thus, it is still possible for a delay or lack of triggering of the apparatus to take place.

SUMMARY OF THE INVENTION

It is an object of the present invention to provide an electronic crash sensor which can operate appropriately in response to any form of crash of any vehicle, more especially to a high speed oblique or pole crash of a vehicle which has a less rigid body or to a compound crash which is compound of various forms of crash, to say nothing of a high speed oblique or pole crash of a vehicle which has a normal rigid body.

In order to attain the object, according to one aspect of the present invention, there is provided a crash sensor which detects crash of a vehicle from an acceleration waveform of an accelerometer to trigger a passenger protecting apparatus calld an air bag, comprising means for peak cutting any portion of the input acceleration waveform lower than a predetermined value, means for time integrating the value obtained by the said peak cutting means, means for subtracting a time integrated value of a predetermined function from the value obtained by the said time integration, means for first comparing the value obtained by the said subtraction with a predetermined time function value to develop a triggering signal, means for second comparing a diffrential of the values obtained by the said subtraction per a predetermined time value with a predetermined value to develop a triggering signal, and means for connecting the said first comparing means and/or the said second comparing means with a triggering circuit.

With the said means for first comparing, an acceleration waveform is identified between a low speed head-on crash and a high speed oblique or pole crash of a normal rigid body vehicle. And with the said means for second comparing a differential of the values obtained by the said subtraction per a predetermined time value with a predetermined value to develop a triggering signal, an acceleration waveform is identified between a high speed oblique or pole crash of a less rigid body vehicle or a compound crash and a low speed head-on crash within a triggering request time, giving attention to a considerable increase of the values obtained by the said subtraction from one point of time.

According to the present invention, a time integrated value, referred to the said subtruction, upon a high speed oblique or pole crash of a normal rigid body vehicle involving much vibration components is greater than a time integrated value of a mere difference of an acceleration from a fixed acceleration, so that an acceleration waveform upon a high speed oblique or pole crash of a normal rigid body vehicle is identified within a triggering request time with the said first comparing means. And the time integrated values, referred to the said subtraction, upon a high speed oblique or pole crash of a less rigid body vehicle or upon a compound crash increase considerably from one point of time, so that an acceleration waveform upon a high speed oblique or pole crash of a less rigid body vehicle or upon a compound crash is identified within a triggering request time with the said second comparing means. Further, the said first comparing means and the said second comparing means are connected with the triggering circuit by way of the said connecting means, an aspect of the said connecting means varies in response to time, and the various aspects of the said connecting means are determind by considering a vehicle characteristic and a condition of no triggering requirement, so that an acceleration waveform upon any form of crash of any vehicle is identified within a triggering request time by the present invention, more especially upon a high speed oblique or pole crash of a less rigid body vehicle or a compund crash, to say nothing of upon a high speed oblique or pole crash of a normal rigid body vehicle. Consequently, a triggering system of a passenger protecting apparatus called an air bag is triggered within a triggering request time in any form of crash of any vehicle.

The above and other objects, features and advantages of the present invention will become apparent from the following description and the appended claims, taken in conjunction with the accompanying drawings.

BRIEF DESCRIPUTION OF THE DRAWINGS

FIG. 1 is a block diagram of a crash sensor showing a embodiment of the present invention;

FIGS. 2(a) and 2(b) are acceleration diagrams illustrating operation of the crash sensor of FIG. 1;

FIG. 3 is a diagram illustrating a variation of a time integrated value of the crash sensor of FIG. 1;

DETAILED DESCRIPTION OF THE PREFERRED EMBODIMENTS

Before the present invention is described in detail in connection with several embodiments thereof, it is to be noted here that an acceleration on the deceleration side, that is, a deceleration, is described as having a positive value in the following description. However, even if it otherwise has a negative value, similar results will he obtained if positive or negative logic is matched among various blocks.

Figure 1:
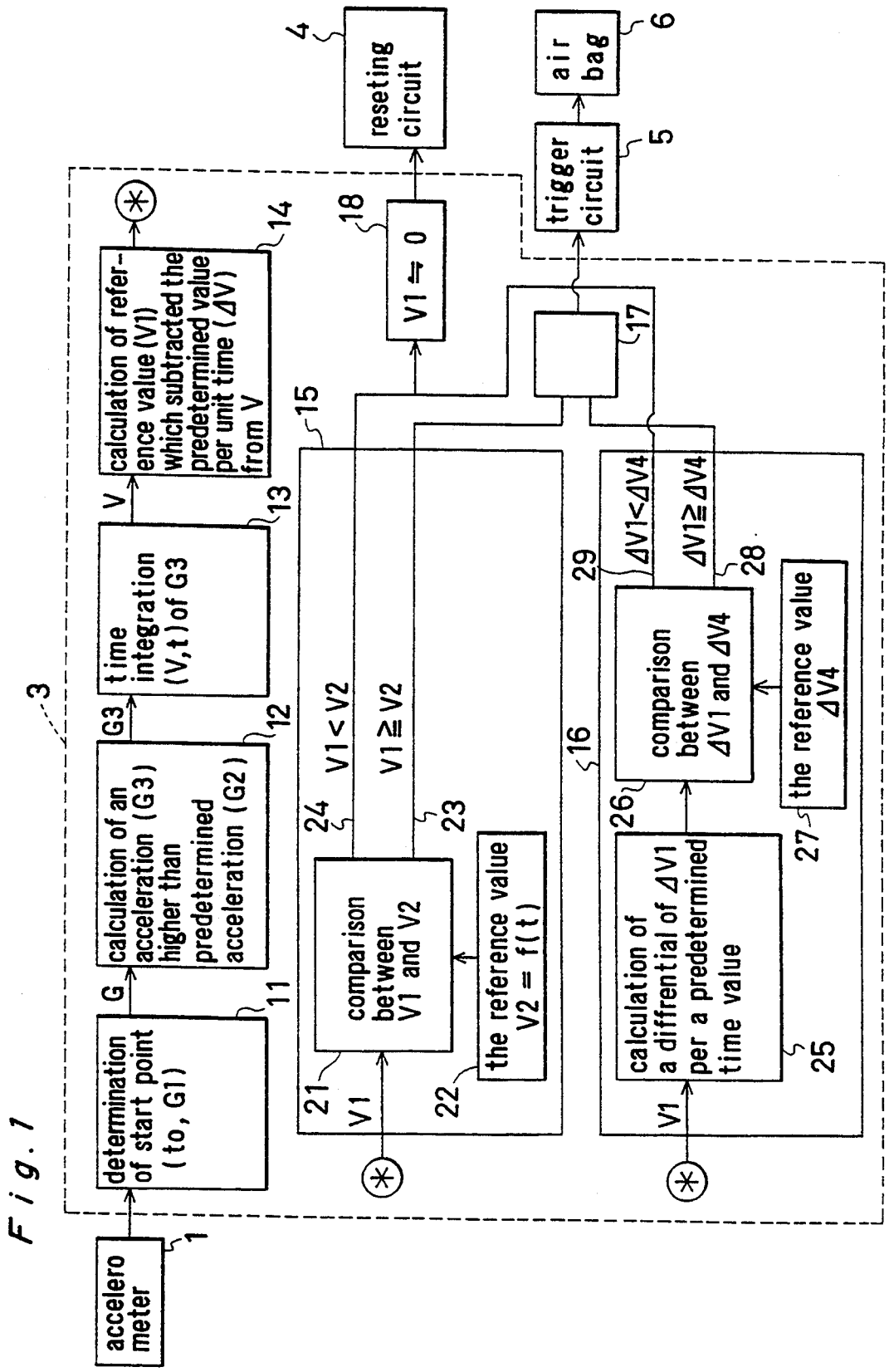

Referring first to FIG. 1, there is shown a crash sensor according to a preferred embodiment of the present invention. The crash sensor shown includes an accelerometer 1 connected to a resetting circuit 4 and a trigger circuit 5 by way of an operating circuit 3. The trigger circuit 5 is connected to operate an air bag 6 which serves as a passenger protecting apparatus. The operating circuit 3 includes a block 11 which determines a point of time t0 at which an acceleration G measured by the accelerometer 1 exceeds a predetermined acceleration G1. At another block 12, calculation of an acceleration G3 higher than another predetermined acceleration G2 is started at the point of time t0. In this instance, an acceleration lower than the acceleration G2 is regarded as equal to zero. Then at a further block 13, time integration of the acceleration G3 is started to calculate an integration value V. At a still further block 14, the predetermined function has a fixed value $\Delta V$, and the predetermined value $\Delta V$ per unit time is subtracted from the integration value V to obtain a reference value V1. This reference value V1 is fed to a yet further block 15 called a first comparing means and to a yet further block 16 called a second comparing means. And a signal as the result of the blocks 15 and 16 is transmitted to the trigger circuit 5 by way of a yet further block 17 called a connecting means.

Operation at the block 15 called the first comparing means will be described in FIG. 1. At yet further block 21, the reference value V1 is compared with a reference value V2 determined in advance at a yet further block 22 as time passes. Then, when the reference value V1 exceeds the reference value V2, a triggering signal is transmitted from the block 15 to the block 17 called the connecting means by way of a line 23.

On the contrary, when the reference value V1 does not exceed the reference value V2, by way of a line 24, it is detected at a yet further block 18, that the reference value V1 is proximate to zero, that is, a negative value or a small positive value, a signal is delivered to the resetting circuit 4 to stop the time integrating operation and reset the reference value V1 and the time to zero. Thus an acceleration waveform is identified between a low speed head-on crash and a high speed oblique or pole crash of a vehicle which has a normal rigid body with the first comparing means, and a triggering signal is transmitted to the trigger circuit by way of the connecting means within a triggering request time.

Operation at the block 16 called the second comparing means will be described in FIG. 1. At a further block 25, a diffrential (Δ V1) of the values V1 is calculated per a predetermined time value. At a further block 26, the diffrential Δ V1 is compared with a predetermined value Δ V4 such as a time function value, at a yet further block 27. When the differential Δ V1 exceeds the predetermined value Δ V4 such as a time function value, a triggering signal is transmitted from the block 26 to the block 17 called the connecting means by way of a line 28.

On the contrary, when the reference value Δ V1 does not exceed the reference value Δ V4 such as a time function value, by way of another line 29, it is detected at the block 18 that the reference value V1 is proximate to zero, that is, a negative value or a small positive value, a signal is delivered to the resetting circuit 4 to stop the time integrating operation and reset the reference value V1 and the time to zero. Therefore a triggering signal is transmitted to the trigger circuit by way of the connecting means within a triggering request time with the second comparing means instead of the first comparing means, giving attention to a considerable increase of the values obtained by the said substraction from one point of time when a triggering signal is not transmitted to the trigger circuit by way of connecting means within a triggering request time with the first comparing means because of a body characteristic such as a less rigid body and a form of crash such as a compound crash.

Operation at the block 17 called the connecting means will be described in FIG. 1. An OR circuit, an AND circuit or a switching circuit is used as the connecting means at the block 17. And further, an aspect of the connecting means varies in response to time. In case of an OR circuit used at the block 17, a triggering signal is transmitted from either the block 15 or the block 16 to the trigger circuit 5 by way of the block 17, and the trigger circuit 5 is triggered. In case of an AND circuit used at the block 17, a triggering signal is transmitted from both the block 15 and the block 16 to the trigger circuit 5 by way of the block 17, and the trigger circuit 5 is triggered. In case of a switching circuit used for the block 17, for example, the block 15 is connected with the trigger circuit 5 by way of the block 17 when a value of a speed meter joined to a switching circuit exceeds the predetermined value of a speed, and the block 16 is connected with the trigger circuit 5 by way of the block 17 when a value of the speed meter joined to a Switting circuit does not exceed the predetermined value of a speed, so that a triggering signal is transmitted from either the block 15 or the block 16 to the trigger circuit 5 by way of the block 17 in response to speed, and the trigger circuit 5 is triggered. Further, in case of an aspect of the connecting means varying in response to time, for example, only the block 15 is connected with the trigger circuit 5 at an early half of a triggering request time by way of the block 17, and then the block 15 and the block 16 are connected with the trigger circuit 5 at a later half of a triggering request time by way of the block 17 using an AND circuit. The time-dependent said aspect of the connecting means is determined by considering a vehicle characteristic and a condition of no triggering requirement.

Figure 2A:
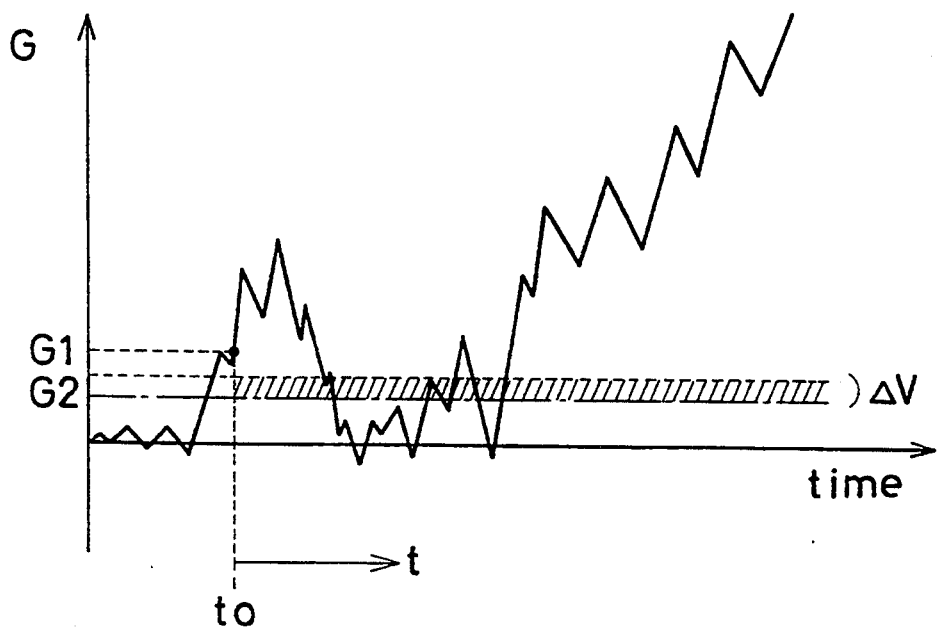
Figure 2B:
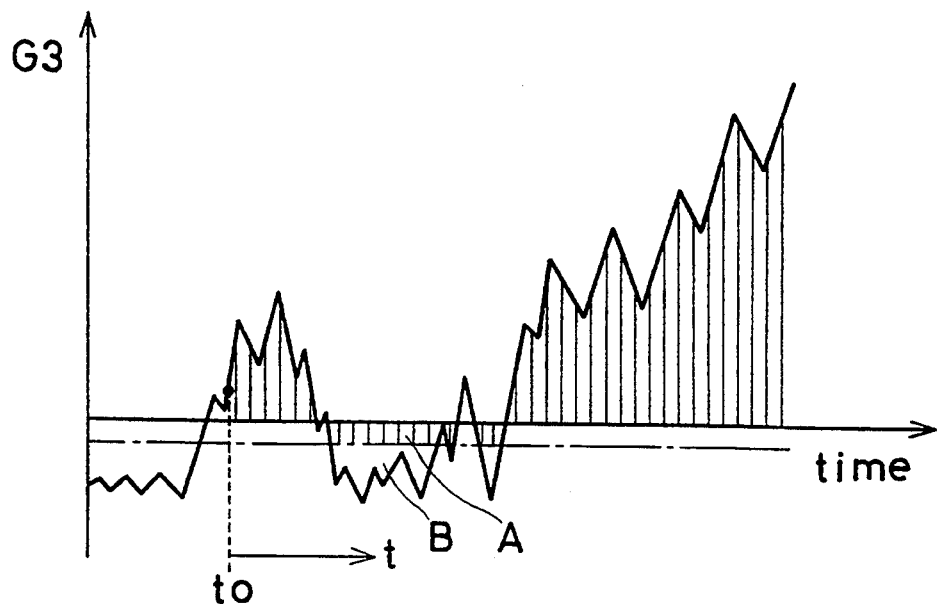
Figure 4:
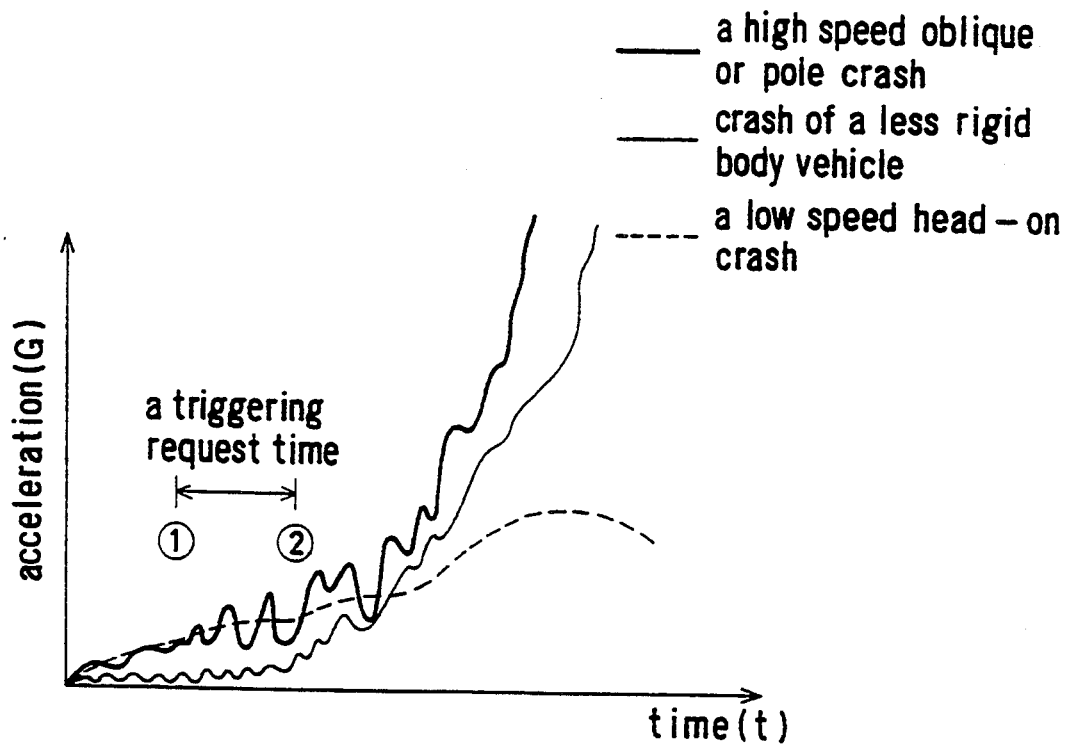
FIG. 4 is a diagram illustrating a time variation of accelerations.

Operation at the block 11 to 14 described above will be described subsequently with reference to FIGS. 2(a) and 2(b). In particular, referring first to FIG. 2(a), operation is started at the point of time t0 at which the acceleration G exceeds the value G1. Then, the acceleration G is regarded as equal to zero when it is lower than the predetermined value G2, and time integration is performed with the acceleration G when the acceleration G is higher than the value G2. Then, the predetermined value a Δ V per unit time shown by a shadowed portion of FIG. 2(a) is subtracted from the acceleration G exceeding the value G2. This corresponds to time integration of a shadowed portion or portions in FIG. 2(b) and makes the reference value V1. In particular, while the shadowed portion A is added as a negative value, another portion B is cut. It is to be noted that the predetermined value G2 is a positive value including G1=G2. Meanwhile, if the function of the aforementioned resetting circuit 4 is used, then starting or resetting of integration can be performed without consciousness of a starting timing.

Figure 5:
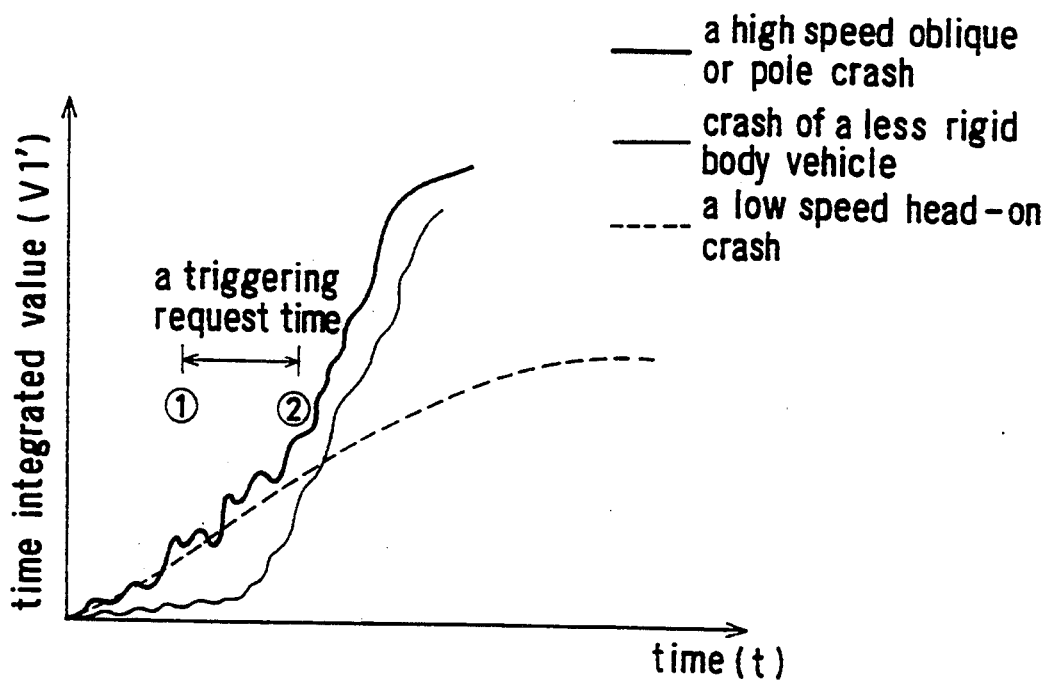
FIG. 5 is a diagram illustrating a variation of time integrated values of a conventional crash sensor.

Operation at the block 15 called the first comparing means, at the block 16 called the second comparing means, and at the block 17 called the connecting means employing an OR circuit described above will be described subsequently with reference to FIG. 3 which shows a variation of a time integrated value V1. While a result of time integration of a difference of a fixed acceleration from an acceleration G presents little distinction between a high speed oblique or pole crash of a normal rigid body vehicle and a low speed head-on crash as in the case of FIG. 5 described hereinabove, the two cases are distinguished clearly from each other in FIG. 3. Where the reference value V2 of the perdetermined time function is set in advance as indicated by chain dash line in FIG. 3, a triggering signal is transmitted from the block 15 to the trigger circuit 5 by way of the block 17 at a point of A. So two requirements of no operation upon a low speed head-on crash and triggering within a triggering request time upon a high speed oblique or pole crash of a normal rigid body vehicle can be satisfied. And also, in cases of a high speed oblique or pole crash of a vehicle which has a less rigid body or a compound crash, from a considerable increase of V1 at a late half of a triggering request time, it is detected at a point of B that diffrential Δ V1 of V1 per Δ t time exceeds predetermind value Δ V4 such as a time function value, and a triggering signal is transmitted from the block 16 to the trigger circuit 5 by way of the block 17 before V1 exceeds predetermind value V2 at a point of C. Thus, this crash sensor triggers the passenger protecting apparatus upon a high speed oblique or pole crash of a less rigid body vehicle or a compound crash as well as a high speed oblique or pole crash of a normal rigid body vehicle.

By the way, the perdetermined value Δ V at the block 14 in FIG. 1 may he replaced by a value of a function, for example, a value of a function of the integration value V at the point of time. Meanwhile, time integration of the acceleration G3 at the block 13 may be replaced by time integration of the K-th power ($K \geq 1$) of the acceleration G or n-th integration of the acceleration G3 or a combination of such time integration and n-th integration in order to distinguish clearly among of a low speed head-on crash, a high speed oblique or pole crash of a normal rigid body vehicle, and a high speed oblique or pole crash of a less rigid body vehicle. Further, while a signal is delivered from the block 18 when the value V1 becomes proximate to zero, such signal may otherwise be developed when the value V1 becomes lower than a predetermined value V3 or when the value V1 becomes lower than a certain value V4 of a function of the acceleration G3 at the point of time. Further, the acceleration G to be used at the block 11 may be replaced by a value Gx obtained by subtracting, from the acceleration G, a value Gf obtained by processing the acceleration G by means of a filter having a time constant longer than 5 seconds in order to eliminate possible influence of zero drift of the accelerometer to raise the accuracy in operation. Further, a mounting structure for the accelerometer 1 may be oscillated in a frequency ranging from 50 to 2,000 Hz (in vibration characteristic in an advancing direction of the automobile) to amplify the acceleration G. Further, an electric circuit of the accelerometer 1 may have an amplification range of a particular frequency band.

Having now fully described the invention, it will be apparent to one of ordinary skill in the art that many changes and modifications can be made thereto without departing from the spirit and scope of the invention as set forth herein.

What is claimed is:

1. A crash sensor, which detects crash of a vehicle from an acceleration waveform of an accelerometer, to trigger a passenger protecting apparatus called an air bag with a trigger circuit, comprising:

means for peak cutting any portion of the input acceleration waveform lower than a predetermined value, means for time integrating the value obtained by the said peak cutting means, means for subtracting a time integrated value of a predetermined function from the value obtained by the said time integration, means for a first comparing the value obtained by the said subtraction with a predetermined time function value to develop a triggering signal, means for second comparing a differential of the values obtained by said subtraction per a predetermined time value with a predetermined value to develop a triggering signal, and means for connecting said first comparing means and said second comparing means to the trigger circuit for actuating the airbag.

2. A crash sensor according to claim 1, comprising an OR circuit as the connecting means.

3. A crash sensor according to claim 1, comprising an AND circuit as the connecting means.

4. A crash sensor according to claim 1, wherein the connecting means comprises a circuit for connecting an output of either the means for a first comparing or the means for a second comparing to said trigger circuit.

5. A crash sensor according to claim 1, wherein the connecting means comprises a circuit for connecting only an output of the means for a first comparing to said trigger circuit during a first period of time and for connecting outputs from both the means for first comparing and the means for second comparing to said trigger circuit during a second period of time that follows the first period of time.

6. A crash sensor according to claim 1, wherein said predetermined value at the second comparing means is a time function value.

7. A crash sensor according to claim 1, wherein said means for connecting comprising a circuit means for outputting a value to said trigger circuit, said circuit means having inputs connected to outputs of the means for a first comparing and the means for second comparing.

8. A crash sensor according to claim 7, wherein said circuit means for outputting comprises an AND circuit.

9. A crash sensor according to claim 7, wherein said circuit means for outputting comprises an OR circuit.

10. A crash sensor according to claim 7, wherein said circuit means for outputting comprises a switching circuit.

11. A crash sensor according to claim 1, wherein said connecting means comprises a circuit connected with a speed meter for connecting an output of the means for a first comparing when a value of said speed meter exceeds the predetermined speed and for connecting an output of the means for a second comparing when a value of said speed meter does not exceed the predetermined speed.

12. A crash sensor according to claim 1, wherein said connecting means comprises a circuit for connecting only an output of the means for said first comparing to said trigger circuit during a first period of time and an AND circuit, connected to outputs from both the means for said first comparing and the means for said second comparing, for sending an output to said trigger circuit during a second period of time that follows the first period of time.

* * * * *